United States Patent
Sung et al.

(10) Patent No.: US 10,277,297 B1
(45) Date of Patent: Apr. 30, 2019

(54) CARRIER AGGREGATION (CA) CONTROL BASED ON MULTI-USER MULTIPLE INPUT MULTIPLE OUTPUT (MIMO) USAGE

(71) Applicant: Sprint Communications Company L.P., Overland Park, KS (US)

(72) Inventors: Sanghoon Sung, Ashburn, VA (US); Yu Wang, Fairfax, VA (US); Udit A. Thakore, Fairfax, VA (US); Dhaval Dipak Mehta, Aldie, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/908,050

(22) Filed: Feb. 28, 2018

(51) Int. Cl.
*H04B 7/06* (2006.01)
*H04W 72/04* (2009.01)
*H04W 24/10* (2009.01)
*H04B 7/0452* (2017.01)

(52) U.S. Cl.
CPC ......... *H04B 7/0617* (2013.01); *H04B 7/0452* (2013.01); *H04W 24/10* (2013.01); *H04W 72/042* (2013.01); *H04W 72/0453* (2013.01)

(58) Field of Classification Search
CPC ... H04B 7/0617; H04B 7/0452; H04W 24/10; H04W 72/042; H04W 72/0453
See application file for complete search history.

(56) References Cited

U.S. PATENT DOCUMENTS

| | | | |
|---|---|---|---|
| 9,137,001 B2* | 9/2015 | Shah ................... | H04L 5/0058 |
| 9,154,198 B2 | 10/2015 | El-Najjar et al. | |
| 2014/0335863 A1* | 11/2014 | Wu .................... | H04W 36/0083 455/436 |
| 2015/0133126 A1* | 5/2015 | Liu .................... | H04W 36/0072 455/437 |
| 2016/0112902 A1* | 4/2016 | Huh .................. | H04W 28/0289 370/235 |
| 2017/0111910 A1* | 4/2017 | Sundar .............. | H04W 72/0453 |
| 2017/0272219 A1* | 9/2017 | Park .................. | H04W 72/0486 |
| 2018/0070293 A1* | 3/2018 | Venkataraman .. | H04W 72/0453 |
| 2018/0176891 A1* | 6/2018 | Kim .................. | H04L 5/00 |

* cited by examiner

*Primary Examiner* — Kenneth T Lam

(57) ABSTRACT

A wireless access point controls Carrier Aggregation (CA) based on Multi-User Multiple Input Multiple Output (MU-MIMO). Baseband circuitry selects CA User Equipment (UEs) based on Radio Frequency (RF) signal strengths for the CA UEs exceeding a CA RF threshold. Transceiver circuitry wirelessly transfers user data to the selected CA UEs over CA links. The transceiver circuitry wirelessly transfers user data to MU-MIMO UEs over MU-MIMO links. The baseband circuitry adjusts the CA RF threshold based on changing MU-MIMO UE loading. The baseband circuitry re-selects the CA UEs based on their current RF signal strengths exceeding the adjusted CA RF threshold. The transceiver circuitry wirelessly transfers user data to the re-selected CA UEs using new CA links.

20 Claims, 8 Drawing Sheets

… (1) …

CARRIER AGGREGATION (CA) CONTROL BASED ON MULTI-USER MULTIPLE INPUT MULTIPLE OUTPUT (MIMO) USAGE

TECHNICAL BACKGROUND

Wireless data networks serve wireless user devices with mobile data communication services like internet access, voice calling, and video calling. The wireless data networks have wireless access points that exchange data over the air with wireless user devices. In Long Term Evolution (LTE) networks, the wireless user devices are referred to as User Equipment (UE), and the wireless access points are referred to as evolved NodeBs (eNodeBs). The UEs exchange data over the air with the eNodeBs at specific times and frequencies that are known as resource blocks.

LTE eNodeBs use Carrier Aggregation (CA) to serve more bandwidth to the UEs. For CA, an eNodeB schedules and transmits data to a single UE over multiple simultaneous resource blocks—multiple frequency bands at the same time. Thus, CA is a high-bandwidth communication service having a fast data rate. The resource blocks that are transmitted from the eNodeB to the UE form a downlink that comprises a Primary Component Carrier (PCC) and additional Secondary Component Carriers. The resource blocks that are transmitted from the UE to the eNodeB are not simultaneous and form an uplink that comprises only a single carrier.

The LTE eNodeBs use an error correction technology known as Hybrid Acknowledgement Repeat Request (HARQ). With HARQ, the eNodeB transfers data to a UE, and the UE transfers acknowledgements for received data to the eNodeB. The eNodeB re-transmits the data if the UE does not acknowledge the data receipt. When HARQ is used with CA, the downlink data is transmitted over the PCC and the additional SCCs, but the data acknowledgements all share the single uplink PCC. Although CA boosts wireless downlink speeds, CA also consumes more uplink resource blocks.

LTE eNodeBs use Multi-User Multiple Input Multiple Output (MIMO) to transfer data to multiple UEs over shared resource blocks. The eNodeB and a pair of the UEs use beamforming and timing technology to maintain data separation in the shared resource block. Since the two UEs share the same resource block on the downlink, MU-MIMO is a low-bandwidth service that efficiently uses network resource blocks and serves low-bandwidth UEs in a more cost-effective manner. Due to the use of beamforming technology on the downlink, the UE transfers Sounding Reference Signals (SRS) on the uplink to the eNodeB. The eNodeBs process the SRS to determine the radio channel response between the eNodeBs and the UEs. The eNodeBs beamform the downlink signals based on the uplink channel response. Although MU-MIMO is an efficient use of bandwidth, MU-MIMO requires uplink resource blocks for the beamforming SRS.

When CA usage spikes, the spike in CA SCCs increases the number of uplink resource blocks for the spike HARQ acknowledgements. When MU-MIMO usage spikes, the spike in SRS increases the demand for uplink resource blocks. At some point of uplink congestion, the SRS does not get the resource blocks to reach the eNodeBs and the beamforming quality of the MU-MIMO service suffers. In addition, the uplink congestion inhibits the resource blocks that transport the HARQ acknowledgements to the eNodeBs which causes unnecessary data re-transmissions and the CA service suffers.

Technical Overview

A wireless access point controls Carrier Aggregation (CA) based on Multi-User Multiple Input Multiple Output (MU-MIMO). Baseband circuitry selects CA User Equipment (UEs) based on Radio Frequency (RF) signal strengths for the CA UEs exceeding a CA RF threshold. Transceiver circuitry wirelessly transfers user data to the selected CA UEs over CA links. The transceiver circuitry wirelessly transfers user data to MU-MIMO UEs over MU-MIMO links. The baseband circuitry adjusts the CA RF threshold based on changing MU-MIMO UE load. The baseband circuitry re-selects the CA UEs based on their current RF signal strengths exceeding the adjusted CA RF threshold. The transceiver circuitry wirelessly transfers additional user data to the re-selected CA UEs over new CA links.

DETAILED DESCRIPTION

Figure 1:
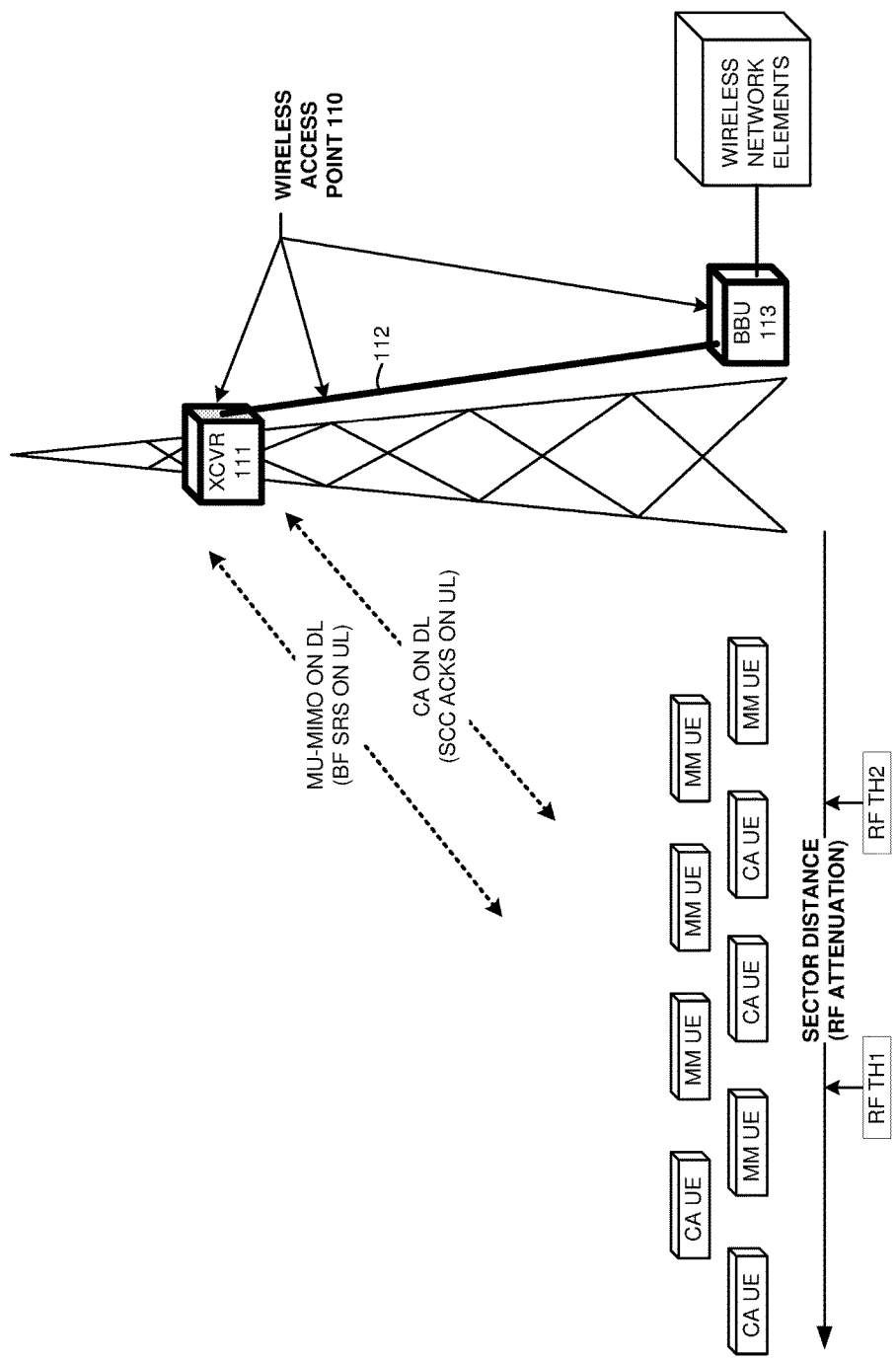
FIG. 1 illustrates a wireless access point to control Carrier Aggregation (CA) for wireless User Equipment (UEs) based on Multi-User Multiple Input Multiple Output (MU-MIMO).

FIG. 1 illustrates wireless access point 110 to control Carrier Aggregation (CA) for wireless User Equipment (UEs) based on Multi-User Multiple Input Multiple Output (MU-MIMO). The wireless UEs could be computers, phones, headsets, graphic displays, vehicles, drones, or some other wireless communication apparatus. Wireless access point 110 comprises wireless transceiver circuitry (XCVR) 111, data link 112, and baseband unit circuitry (BBU) 113.

XCVR 111 comprises antennas, modulators, amplifiers, filters, digital/analog interfaces, Digital Signal Processors (DSPs), Random Access Memory (RAM), persistent data storage, firmware/software, and bus interfaces. XCVR 111 and wireless UE 101 use wireless network protocols like Fifth Generation New Radio (5G NR), Long Term Evolution (LTE), and Institute of Electrical and Electronic Engineers (IEEE) 802.11 (Wifi).

XCVR 111 and BBU 113 communicate over data link 112. Data link 112 uses a data communication protocol like Common Public Radio Interface (CPRI), IEEE 802.3 (Ethernet), Internet Protocol (IP), bus protocols, or some other data coupling—including combinations thereof.

BBU 113 comprises Central Processing Units (CPUs), RAM, persistent data storage, and bus interfaces. BBU 113 also comprises a backhaul transceiver to communicate with wireless network elements. The wireless network elements comprise Mobility Management Entities (MMEs), Serving Gateways (S-GWs), Packet Data Network Gateways (P-GWs), and the like. BBU 113 further comprises software like operating systems and modules for Physical layer (PHY), Media Access Control (MAC), Radio Link Control (RLC), Packet Data Convergence Protocol (PDCP), Radio Resource Control (RRC), S1, GTP, IP, Ethernet, and other networking modules.

XCVR 111, data link 112, and BBU 113 comprise circuitry having computer hardware and software that are configured to form a special-purpose machine—a wireless access point that improves MU-MIMO by controlling CA. The computer hardware comprises processing circuitry like CPUs, DSPs, Graphical Processing Units (GPUs), transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like Control Units (CUs), Logic Units (LUs), and Random Access Memory (RAM). In turn, the CUs, LUs, and RAM are metallically connected to form CPUs, DSPs, GPUs, transceivers, bus circuitry, and memory.

In the computer hardware, the CUs drive data between the RAM and the LUs, and the LUs operate on the data. The CUs also drive interactions with external memory like flash drives, disk drives, and the like. The computer hardware executes machine-level software to control and move data by driving machine-level inputs like voltages and currents to the CUs, LUs, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware into the special-purpose wireless access points described herein.

In operation, XCVR 111 wirelessly transfers data to MU-MIMO UEs (MM UEs) over MU-MIMO downlinks (DL). With MU-MIMO, the MM UEs share communication times and frequencies (like resource blocks) and use beamforming and timing to maintain data separation. The MM UEs share bandwidth to dramatically conserve RF resources for wireless access point 110. XCVR 111 wirelessly receives data from the MM UEs over uplinks (UL). The UL does not use MU-MIMO in this example but could use MU-MIMO in other examples.

To support beamforming on the MU-MIMO DL, the MM UEs wirelessly transmit beamforming Sounding Reference Signals (BF SRS) to XCVR 111. XCVR 111 processes the BR SRS to determine Radio Frequency (RF) characteristics for the MM UEs. XCVR 111 selects RF beam patterns for the MM UEs based on the RF characteristics. XCVR 111 then identifies RF beamforming matrices for the MM UEs to emit the selected RF beams. XCVR 111 wirelessly transfers the data to the MM UEs over the MU-MIMO DL using the beamforming matrices.

Contemporaneously, XCVR 111 wirelessly transfers data to the CA UEs over the CA DL. With CA, XCVR 111 and the CA UEs use Primary Component Carrier (PCC) time/frequency resources for the UL/DL. XCVR 111 and the CA UEs also use Secondary Component Carrier (SCC) time/frequency resources for the DL during the same transmit time. Thus, the CA UEs use wider CA bandwidth to dramatically increase their DL speed. The UL does not use CA in this example but could in other examples. To support the CA SCCs on the DL, the CA UEs wirelessly transmit data Acknowledgements (ACKs) to XCVR 111 over the UL.

The UL for the MM UEs consumes RF resources for the SRS. The UL for the CA UEs consumes RF resources for the ACKs. Unfortunately, the ACKs and the SRS compete for limited UL resources. A dramatic increase in CA adversely affects the beamforming quality on the MU-MIMO DL by choking the MU-MIMO SRS on the UL. A dramatic increase in MU-MIMO adversely affects the CA data rates by choking the SCC ACKs on the UL. Although not shown for clarity, the UL typically transports SRS for the CA UEs and typically transports data ACKs for the MM UEs. Managing UL resources becomes a challenge in a hybrid CA/MU-MIMO system.

To manage the UL resources, BBU 113 select and re-selects CA UEs for CA service if their reported RF signal strength exceeds a CA RF threshold. Over time, wireless access point 110 serves differing levels of MM UEs and CA UEs. BBU 113 adjusts the CA RF threshold based on the current MU-MIMO UE load. BBU 113 raises the CA RF threshold to protect MU-MIMO when CA loading becomes excessive. BBU 113 lowers the CA RF threshold to increase CA as MU-MIMO loading allows.

For example, an RF Threshold 1 (RF TH1) is shown at a distance from wireless access point 110 that corresponds to the transmit power minus RF attenuation to point marked RF TH1. RF TH 1 enables new CA links for UEs located in the inner two-thirds of the wireless sector of wireless access point 110. RF TH 1 inhibits CA for UEs located in the outer third of the wireless sector. RF TH 2 enables new CA links for UEs in the inner third of the wireless sector, and RF TH 2 inhibits CA for UEs located in the outer two-thirds of the wireless sector. Other thresholds could be used. An RF TH in the middle enables new CA links for UEs in the inner half of the wireless sector and inhibits CA for UEs in the outer half of the wireless sector. A very low RF TH at the far left would enable new CA links for all UEs in the wireless sector. A very high RF TH at the far right inhibits CA for all UEs in the wireless sector. Note that other factors, such as CA UE loading on wireless base station 110, could be used along with MU-MIMO loading to set the CA RF threshold.

Advantageously, BBU 113 controls CA usage based on MU-MIMO loading. XCVR 111 wirelessly transfers data to a changing number of MM UEs over new MU-MIMO links in a protected manner. XCVR 111 transfers high-bandwidth data to the to a changing number of CA UEs over new CA links while controlling quality on the MU-MIMO DL.

Figure 2:
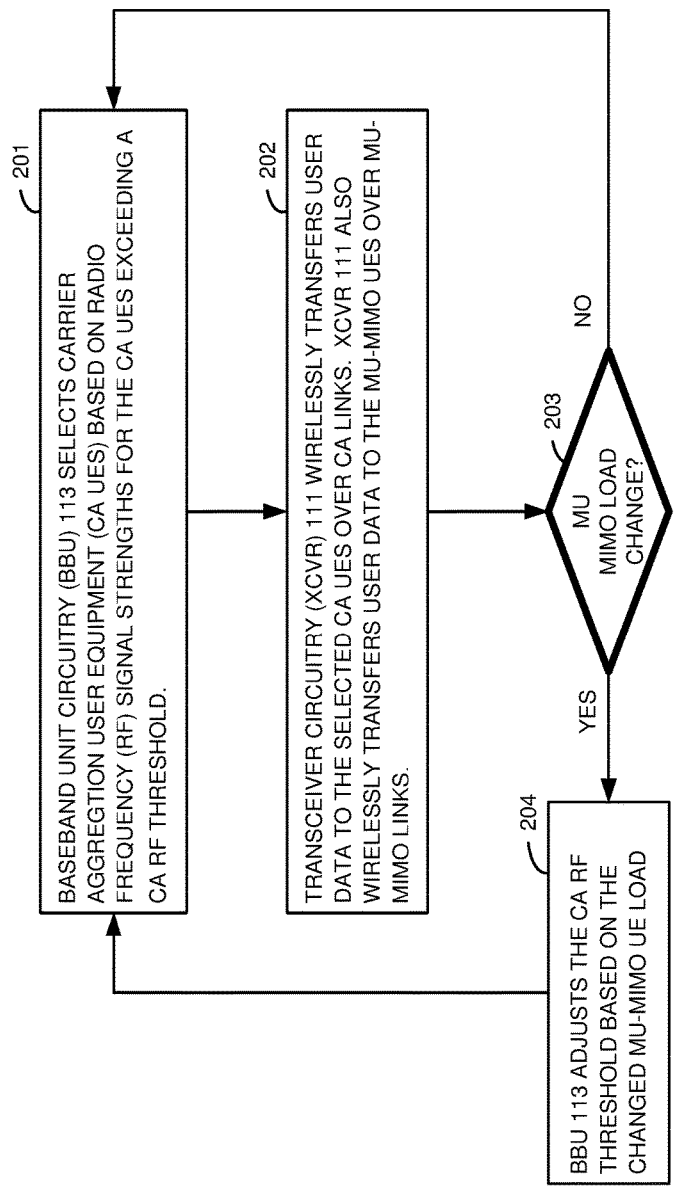
FIG. 2 illustrates the operation of the wireless access point to control CA for wireless UEs based on MU-MIMO.

FIG. 2 illustrates the operation of wireless access point 110 to control CA for wireless UEs based on MU-MIMO. Baseband Unit circuitry (BBU) 113 selects Carrier Aggregation User Equipment (CA UEs) based on Radio Frequency (RF) signal strengths for the CA UEs exceeding a CA RF threshold (201). The CA UEs may report their signal strengths to BBU 113 and/or transceiver circuitry (XCVR) 111 may detect corresponding signal strengths from the CA UEs on the UL. XCVR 111 wirelessly transfers user data to the selected CA UEs over CA links (202). XCVR 111 wirelessly transfers user data to the selected MU-MIMO UEs over Multi-User Multiple Input Multiple Output (MU-MIMO) links (202). BBU 113 monitors MU-MIMO loading and when the loading changes (203), BBU 113 adjusts the CA RF threshold based on the changed MU-MIMO load (204). The operation then returns to process block 201. When a MU-MIMO loading change does not occur (203), the operation returns to process block 201 without adjusting the CA RF threshold. In some examples, MU-MIMO load ranges are correlated to various CA RF thresholds in a data structure in BBU 113. Advantageously, wireless access point 110 protects MU-MIMO quality for some UEs while optimizing CA bandwidth for other UEs.

Figure 3:
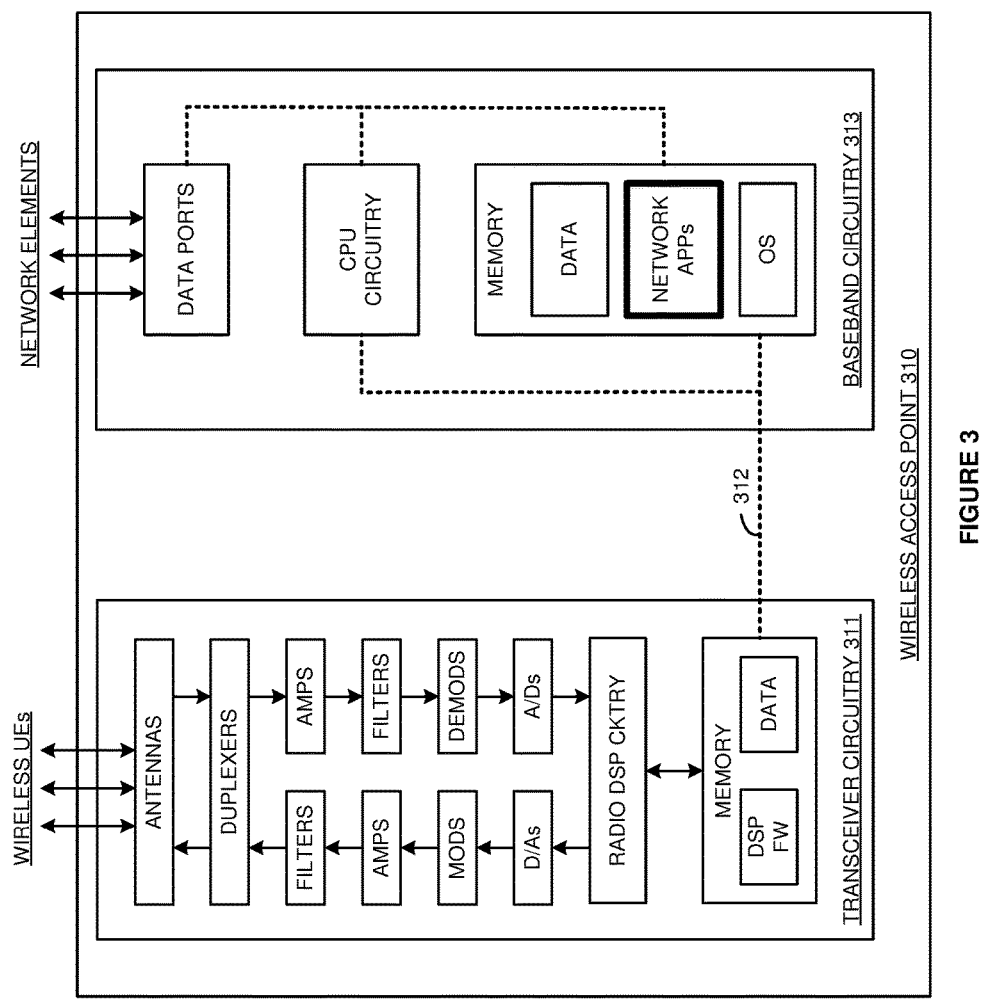
FIG. 3 illustrates transceiver circuitry and baseband circuitry in a wireless access point to control CA for wireless UEs based on MU-MIMO.

FIG. 3 illustrates transceiver circuitry 311 and baseband circuitry 313 in wireless access point 310 to control CA for wireless UEs based on MU-MIMO. Wireless access point 310 is an example of wireless access point 110, although access point 110 may have other configurations and operations. In wireless access point 310, transceiver circuitry 311 and baseband circuitry 313 are coupled by data link 312.

Transceiver circuitry 311 comprises antennas, duplexers, modulators, filters, amplifiers (AMPS), Analog-to-Digital converters (A/Ds), Digital-to-Analog converters (D/As), radio DSP circuitry, memory, and bus interfaces. The memory stores data and DSP firmware (FW). In transceiver circuitry 311, the radio DSP circuitry executes the DSP FW to drive the wireless exchange of the data with the wireless UEs. Data link 312 comprises a CPRI link, IEEE 802.3 link, IP link, or some other data coupling—including combinations thereof.

Baseband circuitry 313 comprises data ports, CPU circuitry, memory, and bus interfaces. The memory stores data, operating system software (OS), and network application software (APPs). The data ports comprise transceiver circuitry to support IEEE 802.3, IP, GTP, S1-MME, S1-U, and the like. In baseband circuitry 313, the CPU circuitry executes the operating system and network applications to control the exchange of the data between the wireless UEs and the wireless network elements.

Figure 4:
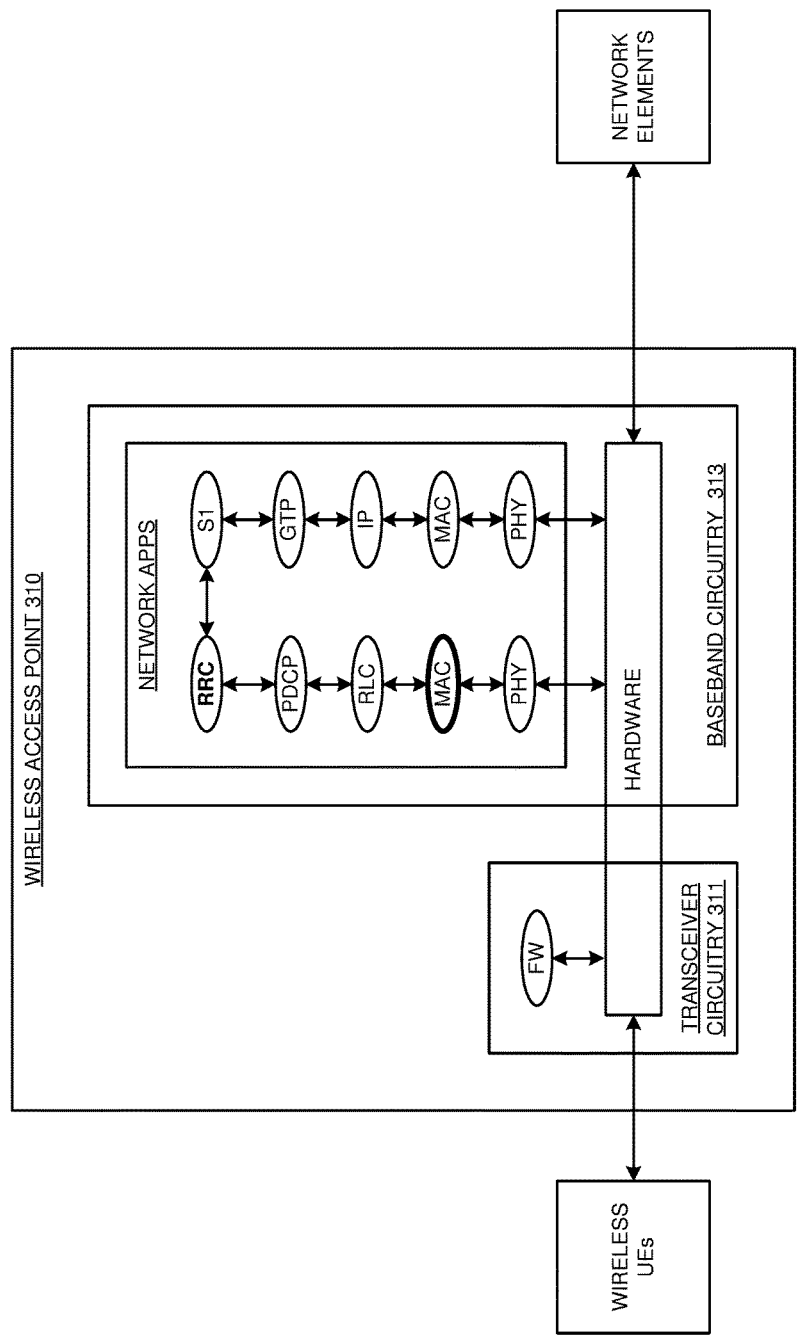
FIG. 4 illustrates transceiver software and baseband software in the wireless access point to control CA for the wireless UEs based on MU-MIMO.

FIG. 4 illustrates transceiver software and baseband software in the wireless access point 310 to control CA for the wireless UEs based on MU-MIMO. Wireless access point 310 is shown with transceiver circuitry 311 and baseband circuitry 313. The hardware represents the circuitry shown on FIG. 3. The hardware in transceiver circuitry 311 executes the FW to drive wireless data communication with the wireless UEs.

The hardware in baseband circuitry 313 executes the network applications. Starting from the network-side and proceeding to the user-side, the network applications comprise a physical module (PHY) coupled to a Media Access Control module (MAC). The MAC is coupled to an IP module (IP), and the IP is coupled to a General Purpose Radio Service Transfer Protocol module (GTP). The GTP is coupled to an S1 module (S1) which is coupled to a Radio Resource Control module (RRC). The RRC is coupled to a Packet Data Convergence Protocol module (PDCP). The PDCP is coupled to a Radio Link Control module (RLC), and the RLC is coupled to another MAC. This MAC is coupled to another PHY. In baseband circuitry 313, the two PHYs call the OS to drive the hardware to support the data communications.

Referring to FIG. 3, the antennas in transceiver circuitry 313 receive wireless UL signals and transfer corresponding electrical signals through the duplexers to the amplifiers. The amplifiers boost the UL signals for the filters which attenuates unwanted energy. A demodulator down converts the amplified and filtered signal from the carrier frequencies. An A/D converts the demodulated analog UL signal into a digital UL signal for the radio DSP circuitry. The radio DSP circuitry recovers UL data from the UL signal and transfers the recovered data to memory. The UL data mainly comprises user data but also includes UE signal strength measurements, UE data Acknowledgements (ACKs), and UE Sounding Reference Signals (SRS). The CPU circuitry executes the OS to process the UL data through the network applications.

Referring to FIG. 4, the PHY transfers the data to the MAC. The MAC monitors MU-MIMO loading and adjusts the CA RF threshold based on the current MU-MIMO load. The MAC typically translates the MU-MIMO load level into the CA RF threshold with a data structure. The MAC may use CA loading along with MU-MIMO loading to set the CA RF threshold. The MAC transfers the UL data for processing by the RLC, PDCP, RRC, S1, GTP, IP, MAC, and PHY to the hardware in baseband circuitry 313. Baseband circuitry 313 transfers the UL data to the wireless network elements.

For the DL, baseband circuitry 313 receives DL data from the wireless network elements. The DL data mainly comprises user data but also indicates which UEs are CA capable and/or MU-MIMO capable. The DL data could transport a data structure to translate MU-MIMO loads into CA RF thresholds. Baseband circuitry 313 processes the DL data through the network applications—PHY, MAC, IP, GTP, S1, RRC, PDCP, RLC, to the MAC. The MAC selects CA-eligible UEs for CA service when their RF signal strength exceeds the CA RF threshold—and possibly other factors. The MAC selects MU-MIMO-eligible UEs for MU-MIMO service based on factors like MU-MIMO bandwidth requirements, access point load, and the like.

The MAC schedules UL/DL resource blocks (times/frequencies) to serve the wireless UEs. The MAC schedules PCC and SCC resource blocks for the CA DL. The MAC schedules PCC resource blocks for the CA UL—including enough UL resource blocks to carry the ACKs for the SCCs. The MAC schedules MU-MIMO resource blocks for the MU-MIMO DL. The MAC schedules resource blocks for the MU-MIMO UL—including enough UL resource blocks to carry the SRS to beamform the MU-MIMO DL. The MAC also selects beamforming matrices for the MU-MIMO UEs based on their SRS. The MAC transfers the DL data and CA/MIMO instructions through the PHY to the baseband circuitry 313 hardware for transfer to transceiver circuitry 311. The hardware in transceiver circuitry 311 processes the DL data and CA/MIMO instructions using its FW to drive wireless DL communications to the UEs.

Referring to FIG. 3, the radio DSP circuitry transfers digital transmit signals having the DL user data to the D/As which transfer corresponding analog transmit signals to the modulators. The modulators upconvert the DL user data to the specified frequencies and transfer the RF DL signals to the amplifiers for power gain. The amplifiers transfer the high-power RF DL signals through band-pass filters for the carrier frequencies and then through the duplexers to the antennas. The RF DL signals drive the antennas to emit wireless signals to the UEs having the DL user data. The DL wireless signals comprise wide-band CA signals for the CA UEs and beamformed signals for the MU-MIMO UEs.

Figure 5:
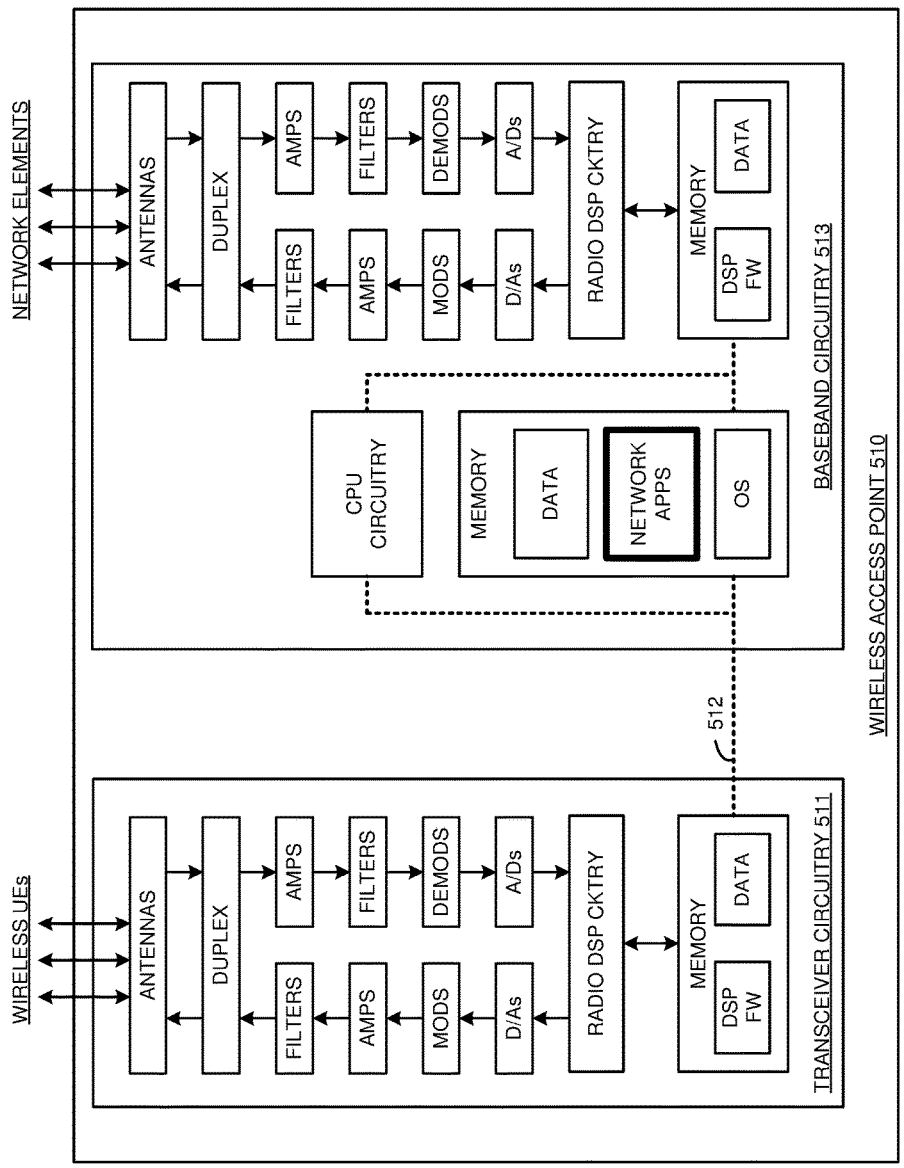
FIG. 5 illustrates transceiver circuitry and baseband circuitry in a wireless access point that has wireless backhaul to control CA for wireless UEs based on MU-MIMO.

FIG. 5 illustrates transceiver circuitry 511 and baseband circuitry 513 in wireless access point 510 that has wireless backhaul to control CA for wireless UEs based on MU-MIMO. Wireless access point 510 is an example of wireless access point 110, although access point 110 may have other configurations and operations. In wireless access point 510, transceiver circuitry 511 and baseband circuitry 513 are coupled by data link 512.

Transceiver circuitry 511 comprises antennas, duplexers, modulators, filters, amplifiers, A/Ds, D/As, radio DSP circuitry, memory, and bus interfaces. The memory stores data and DSP FW. In transceiver circuitry 511, the radio DSP circuitry executes the DSP FW to drive the wireless exchange of the data with the wireless UEs. Data link 512 comprises a CPRI link, IEEE 802.3 link, IP link, or some other data coupling—including combinations thereof.

Baseband circuitry 513 comprises CPU circuitry, memories, and bus interfaces. The memories store data, operating system software, DSP firmware, and network application software. For wireless backhaul, baseband circuitry 513 has antennas, duplexers, modulators, filters, amplifiers, A/Ds, D/As, radio DSP circuitry, memory, and bus interfaces. In transceiver circuitry 511, the radio DSP circuitry executes the DSP FW to drive the wireless exchange of the data with the wireless UEs. Data link 512 comprises a CPRI link, IEEE 802.3 link, IP link, or some other data coupling—including combinations thereof. In baseband circuitry 513, the CPU circuitry executes the operating system and network applications to control the exchange of the data between the wireless UEs and the wireless network elements.

Figure 6:
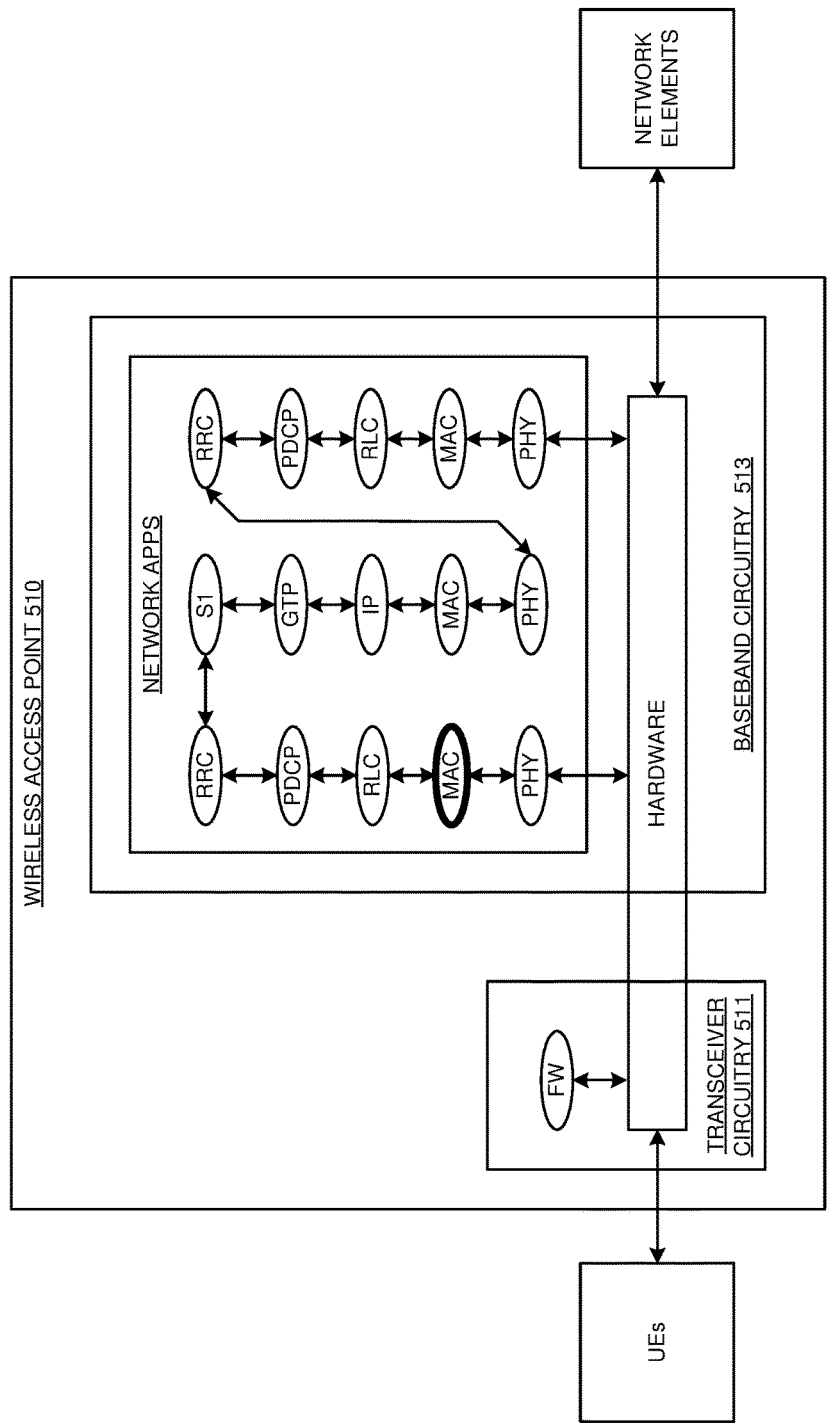
FIG. 6 illustrates transceiver software and baseband software in the wireless access point that has wireless backhaul to control CA for the wireless UEs based on MU-MIMO.

FIG. 6 illustrates transceiver software and baseband software in the wireless access point 510 to control CA for the wireless UEs based on MU-MIMO. Wireless access point 510 is shown with transceiver circuitry 511 and baseband circuitry 513. The hardware represents the circuitry shown on FIG. 5. The hardware in transceiver circuitry 511 executes the FW to drive wireless data communication with the wireless UEs. The hardware in baseband circuitry 513 executes the network applications. Starting from the network-side and proceeding to the user-side, the network applications comprise a PHY, MAC, RLC, PDCP, RRC, PHY, MAC, IP, GTP, S1, RRC, PDCP, RRC, MAC, and PHY. In baseband circuitry 513, the two PHYs call the OS to drive the hardware to support the data communications.

Referring to FIG. 5, the antennas in transceiver circuitry 513 receive wireless UL signals and transfer corresponding electrical signals through the duplexers to the amplifiers. The amplifiers boost the received UL signals for the filters which attenuate unwanted energy. A demodulator downconverts the amplified and filtered signals from the carrier frequencies. A/Ds convert the demodulated analog receive signals into a digital receive signals for the radio DSP circuitry. The radio DSP circuitry recovers UL data from the receive signals and transfers the recovered data to memory. The UL data mainly comprises user data and includes UE signal strength measurements, UE data Acknowledgements (ACKs), and UE Sounding Reference Signals (SRS). The CPU circuitry executes the OS to process the UL data through the network applications.

Referring to FIG. 6, the PHY transfers the data to the MAC. The MAC monitors MU-MIMO loading and adjusts the CA RF threshold based on the current MU-MIMO load. The MAC typically translates the MU-MIMO load level into the CA RF threshold with a data structure. The MAC may use CA loading along with MU-MIMO loading to set the CA RF threshold. The MAC transfers the UL data for processing by the RLC, PDCP, RRC, S1, GTP, IP, MAC, PHY, RRC, PDCP, RLC, MAC, and PHY and then to the hardware in baseband circuitry 513.

Referring to FIG. 5, the radio DSP circuitry transfers digital transmit signals having the UL user data to the D/As which transfer corresponding analog transmit signals to the modulators. The modulators upconvert the UL user data to the specified frequencies and transfers the RF UL signals to the amplifiers for power gain. The amplifiers transfer the high-power RF UL signals through band-pass filters for the carrier frequencies and then through the duplexers to the antennas. The RF UL signals drive the antennas to emit wireless signals having the UL user data to the wireless network elements. The UL wireless signals may comprise wide-band CA signals.

For the DL, baseband circuitry 513 receives DL data from the wireless network elements. The DL data mainly comprises user data but indicates which UEs are CA capable and/or MU-MIMO capable. The DL data could transport a data structure to translate MU-MIMO loads into CA RF thresholds. Baseband circuitry 513 processes the DL data through the network applications—PHY, MAC, RLC, PDCP, RRC, PHY, MAC, IP, GTP, S1, RRC, PDCP, and RLC to the MAC. The MAC selects CA-eligible UEs for CA service if their RF signal strength exceeds the CA RF threshold—and possibly based on other factors. The MAC selects MU-MIMO-eligible UEs for MU-MIMO service based on factors like MU-MIMO bandwidth requirements, access point load, and the like.

The MAC schedules UL/DL resource blocks (times/frequencies) to serve the wireless UEs. The MAC schedules PCC and SCC resource blocks for the CA DL. The MAC schedules PCC resource blocks for the CA UL—including enough UL resource blocks to carry the ACKs for the SCCs. The MAC schedules MU-MIMO resource blocks for the MU-MIMO DL. The MAC schedules resource blocks for the MU-MIMMO UL—including enough UL resource blocks to carry the SRS for beamforming on the MU-MIMO DL. The MAC also selects beamforming matrix instructions for the MU-MIMO UEs based on their SRS.

The MAC transfers the DL data and CA/MIMO instructions through the PHY to the baseband circuitry 513 hardware for transfer to transceiver circuitry 511. The hardware in transceiver circuitry 511 processes the DL data and CA/MIMO instructions using its FW to drive wireless DL communications to the UEs.

Referring to FIG. 5, the radio DSP circuitry transfers digital transmit signals having the DL user data to the D/As which transfer corresponding analog DL signals to the modulators. The modulators upconvert the DL signals to the specified frequencies and transfer the RF DL signals to the amplifiers for power gain. The amplifiers transfer the high-power RF DL signals through band-pass filters for the carrier frequencies and then through the duplexers to the antennas. The RF DL signals drive the antennas to emit wireless signals having the DL user data to the UEs. The DL wireless signals comprise wide-band signals for the CA UEs and beamformed signals for the MU-MIMO UEs.

Figure 7:
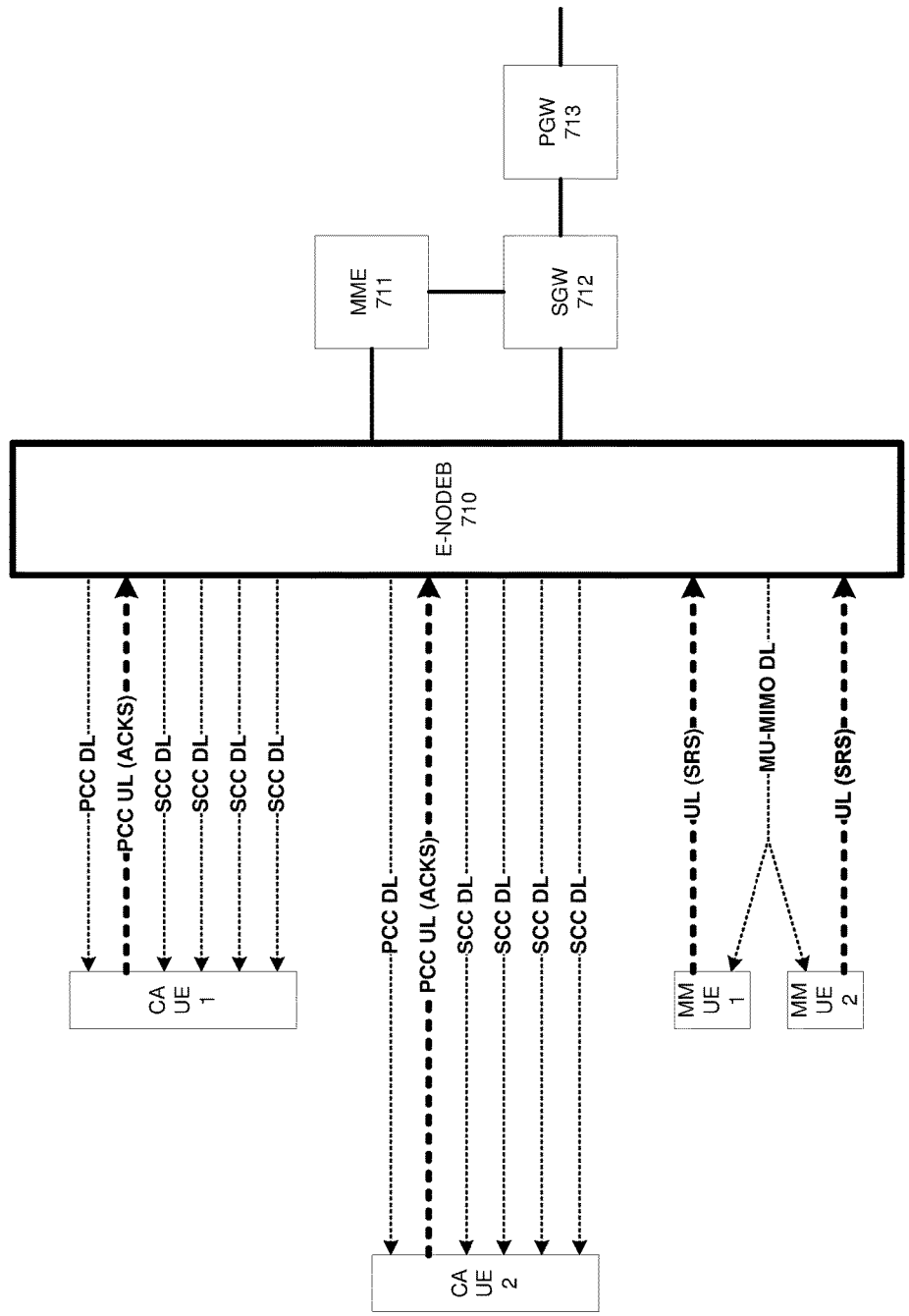
FIG. 7 illustrates a Long Term Evolution (LTE) evolved NodeB (eNodeB) to control CA for wireless UEs based on MU-MIMO when the MU-MIMO UE load is low and the CA UE load can be high.

FIG. 7 illustrates Long Term Evolution (LTE) evolved NodeB (eNodeB) 710 to control CA for wireless UEs based on MU-MIMO when the MU-MIMO (MM) UE load is low and the CA UE load can be high. eNodeB 710 comprises an example of wireless access point 110, although access point 110 may have alternative configurations and operations. The LTE network comprises eNodeB 710, Mobility Management Entity (MME) 711, Serving Gateway (SGW) 712, and Packet Data Network Gateway (PGW) 713.

In operation, the UEs wirelessly attach to eNodeB 710 and exchange RRC connection data. eNodeB 710 and MME 711 exchange S1-MME signaling to establish data sessions for the UEs. MME 711 accesses UE data structures to authorize UEs for CA or MU-MIMO service. MME 711 indicates the CA or MU-MIMO authorizations to eNodeB 710. eNodeB 710 selects authorized UEs for CA based on their signal strength and the CA RF threshold. eNodeB 710 selects authorized UEs for MM based on the MME instructions and factors like signal strength and data requirements.

eNodeB 710 transfers data to CA UE1 over a PCC DL and 4 SCC DLs. eNodeB 710 receives data from CA UE1 over a PCC UL that carries the ACKs for the PCC DL and the four other SCC DLs. In a like manner, eNodeB 710 transfers data to CA UE2 over a PCC DL and 4 SCC DLs. eNodeB 710 receives data from CA UE2 over a PCC UL that carries the ACKs for the PCC DL and the four other SCC DLs. The PCC UL may also carry SRS for CA UE1 and CA UE2.

eNodeB 710 transfers data to MU-MIMO (MM) UE1 and MM UE2 over a shared MU-MIMO resource blocks by using beamforming. eNodeB 710 receives data including beamforming SRS from MM UE1 over its UL. eNodeB 710 receives data including beamforming SRS from MM UE2 over another UL. The ULs may also carry ACKs for MM UE1 and MM UE2.

Figure 8:
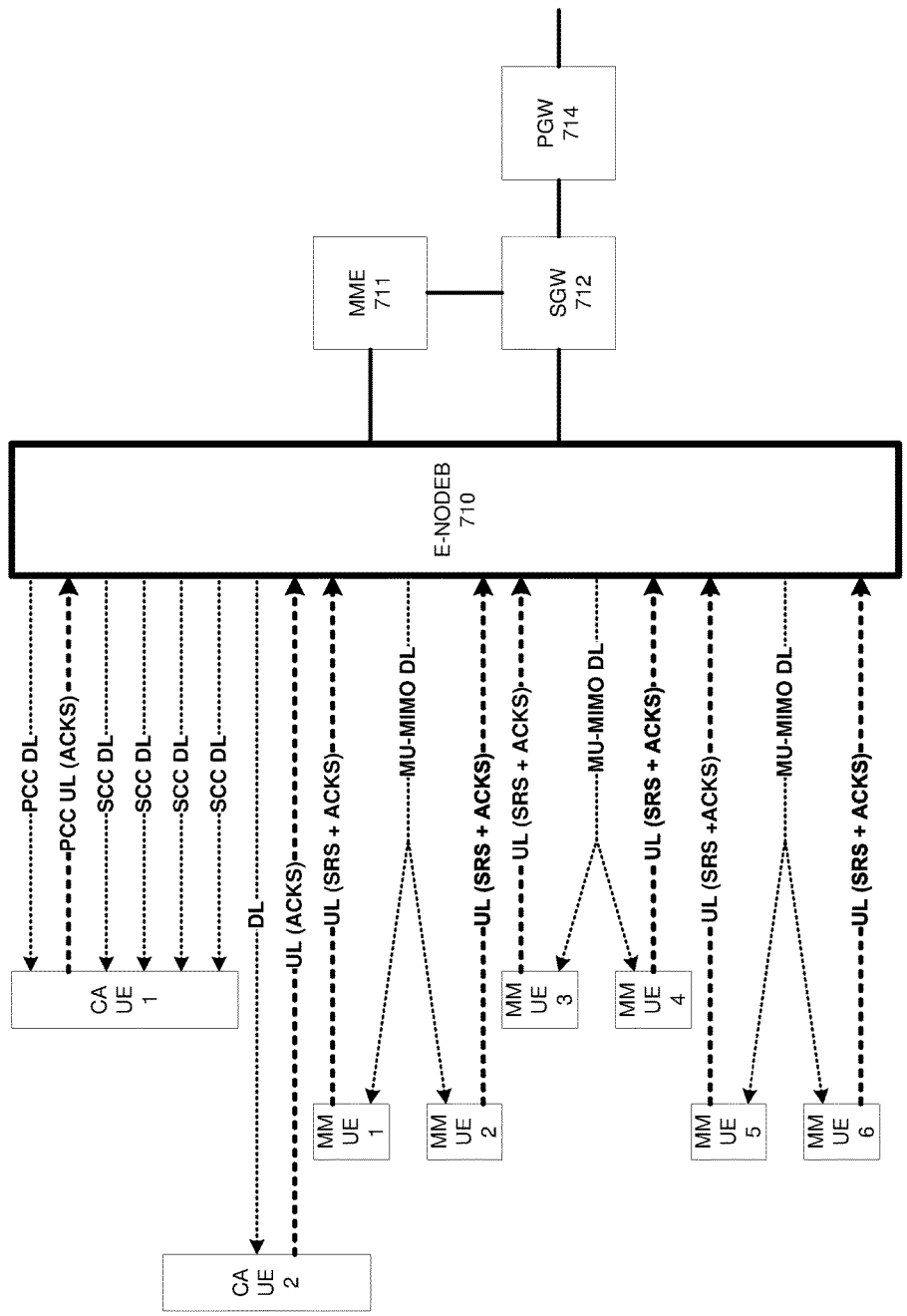
FIG. 8 illustrates the LTE eNodeB to control CA for the wireless UEs based on MU-MIMO when the MU-MIMO UE load is high and the CA UE load is lowered.

FIG. 8 illustrates LTE eNodeB 710 to control CA for the wireless UEs based on MU-MIMO when the MM UE load is high. eNodeB 710 transfers data to MU-MIMO (MM) UE1 and MM UE2 over shared MU-MIMO resources. eNodeB 710 transfers data to MM UE3 and MM UE4 over shared MU-MIMO resources. eNodeB 710 transfers data to MM UE5 and MM UE6 over shared MU-MIMO resources. eNodeB 710 receives data including beamforming SRS from MM UEs 1-6 over their ULs.

In response to the high MM UE load, eNodeB 710 raises the CA RF threshold and re-selects authorized UEs for CA based on their signal strength and the higher CA RF threshold. The signal strength for distant CA UE2 is too low, so eNodeB 710 stops CA service to CA UE2. eNodeB 710 transfers data to CA UE2 over a single DL and receives data from CA UE2 over an UL that carries the ACKs for the DL. Thus, the UL for CA UE2 no longer carries SCC ACKs. The signal strength for proximate CA UE1 is still higher than the raised CA RF threshold, so eNodeB 710 continues CA service to CA UE1. eNodeB 710 transfers data to CA UE1 over a PCC DL and 4 SCC DLs. eNodeB 710 receives data from CA UE1 over a PCC UL that carries the ACKs for the PCC DL and the four other SCC DLs. If MU-MIMO loading increases even more, then CA service to CA UE 1 could be terminated in the manner of CA UE2.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless access point to control Carrier Aggregation (CA) based on Multi-User Multiple Input Multiple Output (MU-MIMO), the method comprising:

baseband circuitry selecting CA User Equipment (UEs) based on Radio Frequency (RF) signal strengths for the CA UEs exceeding a CA RF threshold;

transceiver circuitry wirelessly transferring user data to the selected CA UEs over CA links;

the transceiver circuitry wirelessly transferring other user data to MU-MIMO UEs over MU-MIMO links;

the baseband circuitry adjusting the CA RF threshold based on changing MU-MIMO UE load;

the baseband circuitry re-selecting the CA UEs based on new RF signal strengths for the CA UEs exceeding the adjusted CA RF threshold; and the transceiver circuitry wirelessly transferring additional user data to the re-selected CA UEs using new CA links.

2. The method of claim 1 further comprising:

the transceiver circuitry wirelessly receiving data acknowledgements from the selected CA UEs over Primary Carriers in the CA links; and the transceiver circuitry wirelessly receiving new data acknowledgements from the re-selected CA UEs over new Primary Carriers in the new CA links.

3. The method of claim 1 further comprising:

the transceiver circuitry wirelessly receiving sounding reference signals from the selected MU-MIMO UEs over the MU-MIMO links; and the transceiver circuitry wirelessly receiving new sounding reference signals from the changed MU-MIMO UEs over new MU-MIMO links.

4. The method of claim 1 further comprising:

the transceiver circuitry wirelessly receiving data acknowledgements from the selected CA UEs over Primary Carriers in the CA links and wirelessly receiving sounding reference signals from the MU-MIMO UEs over the MU-MIMO links; and the transceiver circuitry wirelessly receiving new data acknowledgements from the re-selected CA UEs over new Primary Carriers in the new CA links and wirelessly receiving new sounding reference signals from the changed MU-MIMO UEs over new MU-MIMO links.

5. The method of claim 1 wherein the baseband circuitry adjusting the CA RF threshold based on the changed MU-MIMO UE load comprises raising the CA RF threshold to restrict ones of the UEs in an outer third of a wireless sector from using the new CA links.

6. The method of claim 1 wherein the baseband circuitry adjusting the CA RF threshold based on the changed MU-MIMO UE load comprises raising the CA RF threshold to restrict ones of the UEs in an outer half of a wireless sector from using the new CA links.

7. The method of claim 1 wherein the baseband circuitry adjusting the CA RF threshold based on the changed MU-MIMO UE load comprises raising the CA RF threshold to restrict ones of the UEs in an outer two-thirds of a wireless sector from using the new CA links.

8. The method of claim 1 wherein the baseband circuitry adjusting the CA RF threshold based on the changed MU-MIMO UE load comprises lowering the CA RF threshold to enable ones of the UEs in an inner third of a wireless sector to use the new CA links.

9. The method of claim 1 wherein the baseband circuitry adjusting the CA RF threshold based on the changed MU-MIMO UE load comprises lowering the CA RF threshold to enable ones of the UEs in an inner half of a wireless sector to use the new CA links.

10. The method of claim 1 wherein the baseband circuitry adjusting the CA RF threshold based on the changed MU-MIMO UE load comprises lowering the CA RF threshold to enable ones of the UEs in an inner two-thirds of a wireless sector to use the new CA links.

11. A wireless access point to control Carrier Aggregation (CA) based on Multi-User Multiple Input Multiple Output (MU-MIMO), the wireless access point comprising:
    baseband circuitry configured to select CA User Equipment (UEs) based on Radio Frequency (RF) signal strengths for the CA UEs exceeding a CA RF threshold;
    transceiver circuitry configured to wirelessly transfer user data to the selected CA UEs over CA links;
    the transceiver circuitry configured to wirelessly transfer other user data to MU-MIMO UEs over MU-MIMO links;
    the baseband circuitry configured to adjust the CA RF threshold based on changing MU-MIMO UE load;
    the baseband circuitry configured to re-select the CA UEs based on new RF signal strengths for the CA UEs exceeding the adjusted CA RF threshold; and
    the transceiver circuitry configured to wirelessly transfer additional user data to the re-selected CA UEs using new CA links.

12. The wireless access point of claim 11 further comprising:
    the transceiver circuitry configured to wirelessly receive data acknowledgements from the selected CA UEs over Primary Carriers in the CA links; and
    the transceiver circuitry configured to wirelessly receive new data acknowledgements from the re-selected CA UEs over new Primary Carriers in the new CA links.

13. The wireless access point of claim 11 further comprising:
    the transceiver circuitry configured to wirelessly receive sounding reference signals from the selected MU-MIMO UEs over the MU-MIMO links; and
    the transceiver circuitry configured to wirelessly receive new sounding reference signals from the changing MU-MIMO UEs over new MU-MIMO links.

14. The wireless access point of claim 11 further comprising:
    the transceiver circuitry configured to wirelessly receive data acknowledgements from the selected CA UEs over Primary Carriers in the CA links and wirelessly receive sounding reference signals from the MU-MIMO UEs over the MU-MIMO links; and
    the transceiver circuitry configured to wirelessly receive new data acknowledgements from the re-selected CA UEs over new Primary Carriers in the new CA links and wirelessly receive new sounding reference signals from the changed MU-MIMO UEs over new MU-MIMO links.

15. The wireless access point of claim 11 wherein the baseband circuitry is configured to raise the CA RF threshold to restrict ones of the UEs in an outer third of a wireless sector from using the new CA links.

16. The wireless access point of claim 11 wherein the baseband circuitry is configured to raise the CA RF threshold to restrict ones of the UEs in an outer half of a wireless sector from using the new CA links.

17. The wireless access point of claim 11 wherein the baseband circuitry is configured to raise the CA RF threshold to restrict ones of the UEs in an outer two-thirds of a wireless sector from using the new CA links.

18. The wireless access point of claim 11 wherein the baseband circuitry is configured to lower the CA RF threshold to enable ones of the UEs in an inner third of a wireless sector to use the new CA links.

19. The wireless access point of claim 11 wherein the baseband circuitry is configured to lower the CA RF threshold to enable ones of the UEs in an inner half of a wireless sector to use the new CA links.

20. The wireless access point of claim 11 wherein the baseband circuitry is configured to lower the CA RF threshold to enable ones of the UEs in an inner two-thirds of a wireless sector to use the new CA links.

* * * * *